United States Patent
Keidar et al.

(10) Patent No.: US 10,176,139 B2
(45) Date of Patent: Jan. 8, 2019

(54) ADAPTIVE ACCESS CONTROL FOR HARDWARE BLOCKS

(71) Applicant: QUALCOMM Incorporated, San Diego, CA (US)

(72) Inventors: Ron Keidar, San Diego, CA (US); Osman Koyuncu, San Diego, CA (US); Michael Batenburg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 15/595,579

(22) Filed: May 15, 2017

(65) Prior Publication Data
US 2017/0249183 A1 Aug. 31, 2017

Related U.S. Application Data

(62) Division of application No. 14/638,669, filed on Mar. 4, 2015, now Pat. No. 9,767,063.

(51) Int. Cl.
*G06F 13/40* (2006.01)
*G06F 9/455* (2018.01)
(Continued)

(52) U.S. Cl.
CPC ...... *G06F 13/4068* (2013.01); *G06F 9/45558* (2013.01); *G06F 9/5077* (2013.01);
(Continued)

(58) Field of Classification Search
CPC .................................................. G06F 9/45558
See application file for complete search history.

(56) References Cited

U.S. PATENT DOCUMENTS 8,429,276 B1 4/2013 Kumar et al.
8,868,710 B2 10/2014 Schultze et al.
(Continued)

OTHER PUBLICATIONS

International Preliminary Report on Patentability—PCT/US2016/016688, The International Bureau of WIPO—Geneva, Switzerland, Feb. 3, 2017, 7 pgs.
(Continued)

*Primary Examiner* — Farley Abad
(74) *Attorney, Agent, or Firm* — Jae-Hee Choi; Hunter Clark

(57) ABSTRACT

System and method for providing adaptive access to a hardware block on a computer system. In one embodiment, a method includes receiving a first access request and a second access request with an access controller, wherein the second access request is received sequentially after the first access request, and the first access request includes a first master identification and the second access request includes a second master identification, determining if the second master identification is equal to the first master identification, providing access to the second access request if the second master identification is equal to the first master identification, wherein the first master identification is associated with one or more hardware block interface values, invalidating the one or more hardware block interface values associated with the first master identification if the second master identification is not equal to the first master identification, and associating the one or more hardware block interface values with the second master identification and a corresponding privilege.

24 Claims, 6 Drawing Sheets

(51) Int. Cl.
*G06F 9/50* (2006.01)
*G06F 21/82* (2013.01)

(52) U.S. Cl.
CPC .............. *G06F 21/82* (2013.01); *G06F 13/40* (2013.01); *G06F 2009/45579* (2013.01)

(56) References Cited

U.S. PATENT DOCUMENTS

| | | |
|---|---|---|
| 2010/0325454 A1 | 12/2010 | Parthasarathy |
| 2012/0047576 A1 | 2/2012 | Do et al. |
| 2012/0102564 A1 | 4/2012 | Schentrup et al. |
| 2014/0282590 A1 | 9/2014 | Cavage et al. |
| 2016/0259750 A1 | 9/2016 | Keidar et al. |

OTHER PUBLICATIONS

International Search Report and Written Opinion—PCT/US2016/016688—ISA/EPO May 3, 2016—10 pgs.

| Master / MasterID<br>Domain / DomainID | TrustZone | Modem | Sec-Proc | HV Mngd | HV Mngd | HV Mngd | HV Mngd | HV Mngd |
|---|---|---|---|---|---|---|---|---|
| | 1 | 2 | 3 | 4 | 5 | 6 | 7 | 8 |
| Defer domain 0 | + | + | + | + | + | + | + | + |
| TrustZone 1 | + | - | - | - | - | - | - | - |
| Modem 2 | - | + | - | - | - | - | - | - |
| Sec-Proc 3 | - | - | + | - | - | - | - | - |
| HV 4 | + | - | + | * | * | * | * | * |
| Video 5 | + | - | + | * | * | * | * | * |
| Audio 6 | + | - | + | * | * | * | * | * |
| Enterprise 7 | + | - | + | * | * | * | * | * |
| HLOS 8 | + | + | + | * | * | * | * | * |
| HV AdHoc 9-15 | - | - | - | * | * | * | * | * |

+ Master can use this Domain
- Master cannot use this Domain
* Privilege managed by HyperVisor

FIG. 4

ADAPTIVE ACCESS CONTROL FOR HARDWARE BLOCKS

CROSS-REFERENCE TO RELATED APPLICATIONS

This application is a divisional of prior U.S. patent application Ser. No. 14/638,669, filed Mar. 4, 2015, entitled "ADAPTIVE ACCESS CONTROL FOR HARDWARE BLOCKS," the entire contents of which is hereby incorporated herein by reference.

BACKGROUND

Distributed computing systems are becoming more prevalent as the demand for processing capacity increases. Various forms of distributed computing systems exist, such as portions of processing capacity of multiple computers being allocated for a common task. Distributed computing systems may comprise different physical processors, portions of different physical processors, multiple operating systems resident on multiple processors, multiple operating systems resident on a single processor, combinations of two or more of any of these or still other configurations. Some distributed computing systems may include multiple processing units, high level operating systems, and processes which are disparate (i.e., not related), and do not form clusters of trust. In systems with security properties, access control may be an essential capability. Hardware (HW) resources with access control may use a locking mechanisms to implement access control to allow one entity access to an interface. Some distributed system may use Virtualized hardware to support many masters over many interfaces. In general, configuring access control mechanisms may be cumbersome, and may require a centralized supervisor or administrator to manage the resources, and protocols between the supervisor and the users to allocate and release resources. Some distributed systems avoid such complexity by supporting only static resource allocation and thus lose the ability of the hardware to support dynamic resource allocation.

SUMMARY

An example of method of providing access to slave side memory resources based on an identity of a master side entity according to the disclosure includes determining a current access owner, receiving a memory access command from the master side entity, processing the memory access command based on a domain mask associated with the master side entity if the master side entity is the current access owner, if the master side entity is not the current access owner, then invalidating all existing keys, determining the domain mask associated with the master side entity, processing the memory access command based on the domain mask associated with the master side entity, and setting the current access owner equal to the master side entity.

Implementations of such a method may include one or more of the following features. The master side entity may be a hypervisor, and the memory access command may include a hypervisor machine identity (HVID) value. The memory access command may be received from a resource group of a Memory Protection Unit (MPU). The memory access command may include a machine identity (MID) value. Determining the domain mask associated with the master side entity may include providing the MID value to one or more multiplexers and receiving a domain identification from the one or more multiplexers.

An example system for providing access to slave side memory resources based on an identity of a master side entity according to the disclosure includes a memory unit for storing instructions and a processor unit coupled to the memory unit and configured to determine a current access owner, receive a memory access command from the master side entity, process the memory access command based on a domain mask associated with the master side entity if the master side entity is the current access owner, if the master side entity is not the current access owner, then invalidate all existing keys, determine the domain mask associated with the master side entity, process the memory access command based on the domain mask associated with the master side entity, and set the current access owner equal to the master side entity.

Implementations of such a system may include one or more of the following features. The master side entity may be a hypervisor, and the memory access command may include a hypervisor machine identity (HVID) value. The memory access command may be received from a resource group of a Memory Protection Unit (MPU). The memory access command may include a machine identity (MID) value. The processing unit may be configure to provide the MID value to one or more multiplexers and receive a domain identification from the one or more multiplexers.

An example of an apparatus for providing access to slave side memory resources based on an identity of a master side entity according to the disclosure includes means for determining a current access owner, means for receiving a memory access command from the master side entity, means for processing the memory access command based on a domain mask associated with the master side entity if the master side entity is the current access owner, if the master side entity is not the current access owner, then means for invalidating all existing keys, means for determining the domain mask associated with the master side entity, means for processing the memory access command based on the domain mask associated with the master side entity, and means for setting the current access owner equal to the master side entity.

An example of a non-transitory processor-readable storage medium comprising instruction for providing access to slave side memory resources based on an identity of a master side entity according to the disclosure includes code for determining a current access owner, code for receiving a memory access command from the master side entity, code for processing the memory access command based on a domain mask associated with the master side entity if the master side entity is the current access owner, if the master side entity is not the current access owner, then code for invalidating all existing keys, code for determining the domain mask associated with the master side entity, code for processing the memory access command based on the domain mask associated with the master side entity, and code for setting the current access owner equal to the master side entity.

Items and/or techniques described herein may provide one or more of the following capabilities, and/or other capabilities not mentioned. A master side entity initiates access to a slave side hardware memory. Identification information, (e.g., Machine ID (MID), Virtual Machine ID (VMID), or other identification) are included in a memory access command received by the slave side hardware. Memory access is granted based on the identification information. Changes in the identification information in subsequent commands are recognized. On a change in the identification information, storage and state information associated with the previous identification information are erased and/or invalidated. Adaptive access control is provided. Hardware registers, or other memory devices, are used to store domain information associated with different masters. Privileges associated with a command interface are adapted based on the identification information included in the command. Virtualized hardware with identical interfaces and different identification information may access slave side memory resources. Other capabilities may be provided and not every implementation according to the disclosure must provide any, let alone all, of the capabilities discussed.

BRIEF DESCRIPTION OF THE DRAWINGS

FIG. 4 is a portion of an access table as a master domain table shown in FIG. 3.

DETAILED DESCRIPTION

Figure 1:
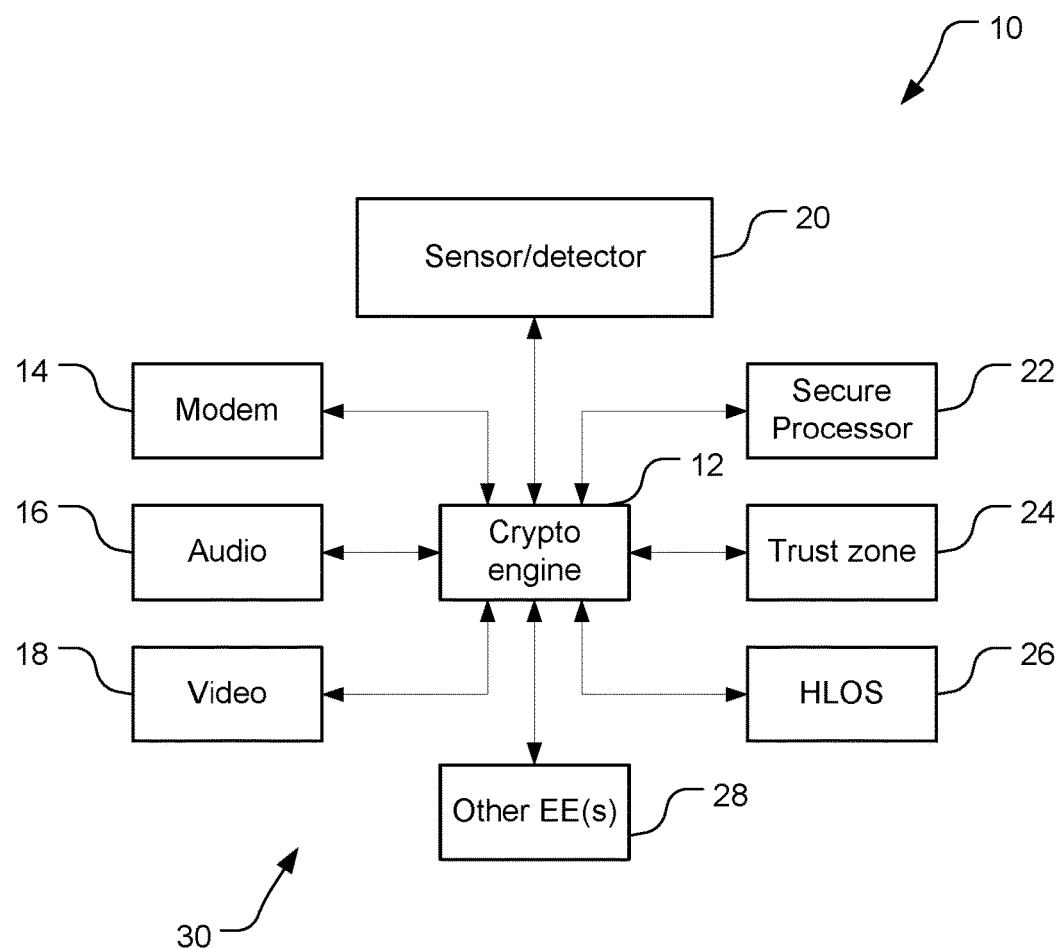
FIG. 1 is a block diagram of a distributed computing system.

Techniques are discussed for providing secure access to memory in a hardware block. For example, a master side entity (e.g. CPU, DSP) may initiate access to memory stored in slave side hardware (e.g. read or write operation). Examples of slave side hardware include Random Access Memory (RAM), Read-Only Memory (ROM), or other hardware (HW) registers. Master side access control is control over the memory access done by the master, and slave side access control is the control on the access is done at the slave side. A System Memory Management Unit (SMMU) may be used in a master side access control solution (e.g., ARM® SMMU Architecture), and a Memory Protection Unit (MPU) may be used in a slave side access control solution (e.g., ARM® MPU region).

In a slave side access control solution, the identity of the calling entity may be known based on caller information bits included in a call for access. For example, a call initiated by a master side entity and received by slave side hardware may include a Machine ID (MID) or a Virtual Machine ID (VMID) to indicate the identity of the caller. In addition to, or as a replacement to a MID, the caller identification information may include additional bits to identify a master. In an example, three secure masters may be a Secure Processor (SP), a TrustZone (NS), and a Modem (MSA), and three additional bits may be used to uniquely identify each of the masters. Designated bits (e.g., additional bits) may be used based on system design considerations such as the number of masters, processing capabilities of the slave side hardware, and the system security plan. The designated bits may augment or replace the MID. An MPU in the slave side hardware may read the ID information included in the call for memory resources (e.g., designated bits, MID, VMID), and use the ID information to determine whether the memory access call is approved or rejected.

In general, in a master side access control architecture with an SMMU, the SMMU may be configured to remove the identity of the calling entity when it translates the calling entity's virtual memory address to a physical address. A calling entity may be, for example, a High Level Operating System (HLOS), one or more Execution Environments (EEs), a TrustZone (TZ), a secure processor, a modem, or other physical and virtual hardware constructs. The SMMU may translate from virtual addresses (which are used by the calling entity) to the physical address in which the hardware block resides. In an example, a security hardware block may allocate individual channels to each calling entity. For example if channel 1 is assigned to the HLOS, only the virtual addresses of the HLOS areas are translated to channel 1, and for the other areas, no address will ever be translated to channel 1. Different channels may be assigned to different calling entities by exposing a part of the address space to their virtual world. In the SMMU solution, the slave side hardware does not know who the calling entity is. The slave side hardware cannot identify the calling entity because it does not have identity information, it just has an access address.

While master side (e.g., SMMU), and slave side (e.g., MPU) access control are used to regulate system access, it is sometimes essential for the slave side hardware (HW) blocks to identify the caller. This is especially the case if the slave side hardware must perform on the behalf of the caller (e.g., DMA, Disk Controller, CyrptoEngine). In prior solutions, this would require further configuration of the specific slave side HW block, and a customization (e.g., dedicated programming) to the configuration of the SMMU and/or MPU. Additionally, this type of customization requires strict synchronization between the configuration of that slave side HW block (e.g., DMA, Disk Controller, CryptoEngine) and the access control that protects it (e.g., SMMU or MPU). To avoid the error prone and complex local configuration, a slave side HW block may adapt its configuration to the system level access control (e.g., MPU, SMMU). The slave side hardware in a distributed computing system may be configured to track/monitor the entity ID of a master side caller (e.g., by monitoring the designated bits, MID, VMID), and provide adaptive domain access based on the entity ID information. The adaptive access may reduce the synchronization complexities associated with channelization required in previous SMMU and/or MPU based solutions.

Referring to FIG. 1, a distributed computing system 10 includes an encryption/decryption engine, i.e., a crypto engine, 12, and several execution environments (EEs) 30 including a modem 14, an audio EE 16, a video EE 18, a sensor/detector EE 20, an Secure Processor EE 22, a trust zone EE 24, a high-level operating system (HLOS) EE 26, and one or more other execution environments 28. The other EE(s) 28 may include one or more EEs similar to the EEs shown, e.g., may include another sensor/detector EE, another video EE, etc. The EEs 30 may include a hypervisor configured to help manage multiple execution environments (e.g., virtual machines) and the corresponding hardware resources. The sensor/detector EE 20 may be any of a variety of sensors such as a camera, a Satellite Positioning System (SPS) receiver, a microphone, or a biometric sensor, etc. A biometric sensor may be any of a variety of sensors such as a fingerprint sensor, an electrocardiogram (ECG) sensor, an electroencephalogram (EEG) sensor, etc. For simplicity, the "EE" is omitted from the boxes in the figures. Further, the execution environments may be referred to as modules.

Each of the execution environments 30 may be implemented by hardware, firmware, one or more processors, or a combination of any of these. The execution environments may include a hypervisor configured to manage one or more instances of Virtual Machines (VM) algorithms executing on one or more processors. Multiple processors may be used to implement the execution environments, with each execution environment being implemented by one or more processors, or with one or more groups of the execution environments 30 (i.e., two or more execution environments per group) each being implemented by a single processor. Where a single processor implements multiple ones of the execution environments 30 (possibly all of the execution environments 30), the execution environments 30 are distinct operating systems implemented by the processor. The execution environments 30 may be generically referred to as operating systems or virtual machines. The execution environments 30 are modules that process respective information and that may share information between them in a confidential manner. The execution environments 30 shown are examples of execution environments and other execution environments may be provided, and/or one or more of the execution environments 14, 16, 18, 20, 22, 24, 26, 28 may be omitted from the system 10. The system 10 may be used for a variety of purposes and the techniques described herein are applicable to any of a wide variety of applications of the system 10 in order to pass information between execution environments securely.

Figure 2:
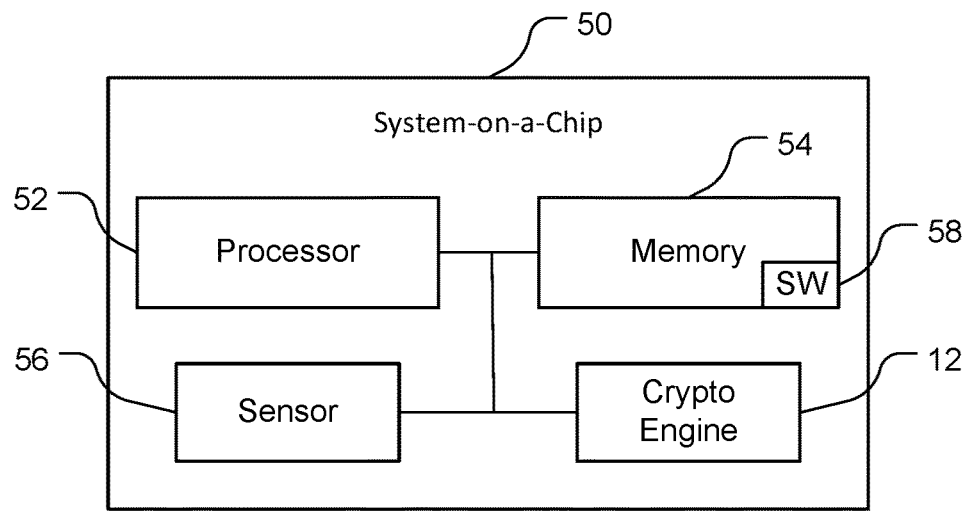
FIG. 2 is a block diagram of a system on a chip for implementing the system shown in FIG. 1.

Referring also to FIG. 2, a System-on-a-Chip (SoC) 50 for implementing the system 10 shown in FIG. 1 includes a processor 52, memory 54, a sensor 56, and the crypto engine 12. The processor 52 may include more than one processor and the sensor 56 may include more than one sensor. The sensor 56 is optional and may be omitted, e.g., if there is no audio, video, biometric, or other information to be sensed (e.g., measured). Further, the sensor 56 (e.g., or one or more sensors if the sensor 56 include more than one sensor) may be disposed externally to (i.e., off) the SoC 50. The processor 52 is preferably an intelligent hardware device, for example a central processing unit (CPU) such as those made or designed by ARM®, Intel® Corporation, or AMD®, a microcontroller, an application specific integrated circuit (ASIC), etc. The processor 52 may comprise multiple separate physical entities that can be distributed in the SoC 50. The processor 52 may include a MPU with configurable regions (e.g., such as in the ARM® Cortex™—M3). The memory 54 includes random access memory (RAM) and read-only memory (ROM). The memory 54 is a non-transitory, processor-readable storage medium that stores software 58 which is processor-readable, processor-executable software code containing instructions that are configured to, when executed, cause the processor 52 to perform various functions described herein (although the description may refer only to the processor 52 performing the functions). Alternatively, the software 58 may not be directly executable by the processor 52 but configured to cause the processor 52, for example when compiled and executed, to perform the functions. The processor 52 is communicatively coupled to the memory 54. The crypto engine 12 is a hardware block configured to receive master side memory access calls from the execution environments, determine a transaction owner based on entity ID information, and provide access to one or more domains based on the entity ID information. The crypto engine 12 may be configured to deny access to one or more domains based on the entity ID information, determine changes in transaction ownership, and erase or invalidate existing configuration of interfaces based on transaction ownership changes. In an embodiment, the crypto engine 12 may also be configured to store encryption keys, encrypt plain text into cipher text, store cipher text, decrypt cipher text into reconstituted plain text, and store the reconstituted plain text.

The processor 52 in conjunction with the memory 54, and the sensor 56 as appropriate, are configured to implement the execution environments 30. Any of the execution environments 30 and the crypto engine 12 may have its own processor, or may be configured as a virtual machine configured to utilize at least a portion of the processing capabilities of the processor 52 and the memory 54. The memory 54 may be a collection of memories including one or more memories for each of the execution environments 30.

The memory 54 may include a joint memory that is used by multiple ones of the execution environments 30. This joint memory may not be a shared memory, i.e., different execution environments 30 may not be able to access the same memory location such that multiple execution environments 30 would not be able to write to a single memory location, and one execution environment 30 would not be able to write to a memory location with another of the execution environments 30 able to read that memory location. Thus, an indication that an execution environment 30 receives information or provides information may be equivalent to, and may be implemented by, that information being read from the joint memory by the execution environment 30 or provided to the joint memory by the execution environment 30. The joint memory may include a memory management unit for controlling access to its memory locations, e.g., for storing information to and/or reading information from the memory locations.

The execution environments 30 may be master side operating systems or virtual machines that process a variety of information, for example to provide audio, video, biometric, and/or other information. Each of the execution environments 30 may be communicatively coupled to the crypto engine 12 to provide information to the crypto engine 12. For example, a master side execution environment may be coupled to the crypto engine via a private key bus or a public key bus. A hypervisor may be used to control the communications between the crypto engine 12 and one or more virtual machines, or other execution environments 30. The crypto engine 12 can securely identify the owner (i.e., calling entity) in a master side memory access call based on the ID information included the call (e.g., designated bits, MID, VMID). In an example, the execution environments 30 may also provide information, including encryption keys, to or receive information from the crypto engine 12, or may provide commands to have the crypto engine 12 encrypt or decrypt information indicated by the execution environments 30.

Figure 3:
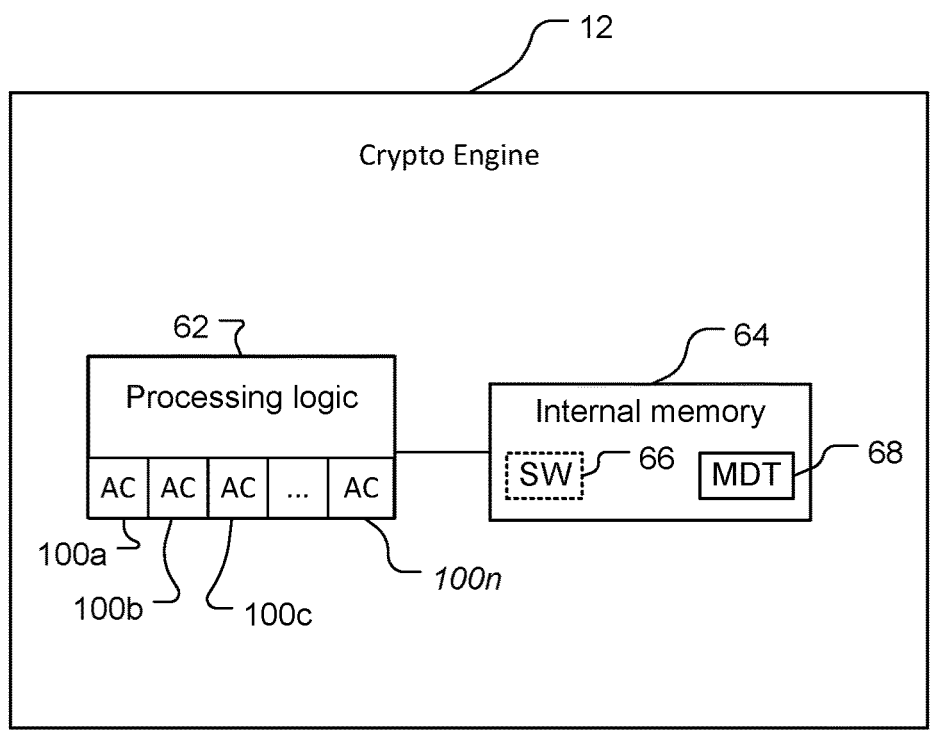
FIG. 3 is a block diagram of a computer system for implementing a crypto engine shown in FIG. 1.

Referring to FIG. 3, with further reference to FIGS. 1-2, the crypto engine 12 may be implemented with a computer system including processing logic 62 an internal memory 64 including software (SW) 66 and a conceptual Masters and Domains Table (MDT) 68. In general, the internal memory 64 is not accessible by the execution environments 30. The processing logic 62 is preferably intelligent hardware logic devices configured to determine a transaction owner based on identity information associated with a master side calling entity, determine changes in transaction ownership, and grant/deny/invalidate domain access based on the transaction ownership. In an example, the processing logic 62 may comprise at least one central processing unit (CPU) such as those made or designed by ARM®, Intel® Corporation, or AMD®, a microcontroller, an application specific integrated circuit (ASIC), etc. The processing logic 62 may comprise multiple separate physical entities that can be distributed in the SoC 50. The crypto engine 12 may be implemented as a virtual system (i.e., as virtual hardware), and multiple instances of the crypto engine may be executing in a computer system. In an embodiment, the processing logic 62 may also include one or more access controllers 100*a*, 100*b*, 100*c*, 100*n* comprising multiplexers and comparator modules configured to detect ownership changes in memory access transactions. The internal memory 64 may include random access memory (RAM) and read-only memory (ROM). If the software 66 is included, then the internal memory 64 storing the software 66 is a non-transitory, processor-readable storage medium and the software 66 is processor-readable, processor-executable software code containing instructions that are configured to, when executed, cause the processing logic 62 to perform various functions described herein (although the description may refer only to the processing logic 62 performing the functions). Alternatively, the software 66 may not be directly executable by the processing logic 62 but configured to, for example when compiled and executed, cause the processing logic 62 to perform the functions. The processing logic 62 is communicatively coupled to the internal memory 64, e.g., to access information associated with the conceptual masters and domain table 68. The processing logic 62 either alone, or in combination with the internal memory 64, provides means for performing functions as described herein, for example, receiving a command (e.g., memory access call) from a master side entity (e.g., via a MPU), determining a transaction owner based on the identity of the calling entity, comparing the transaction owner with a current owner (i.e., the previous transaction owner), granting appropriate access (i.e., based on the conceptual MDT 68) if the transaction owner and the current owner are the same, or invalidating everything the current interface owns (e.g., storage, secrets, states, privileges) if there is a change in ownership (i.e., the transaction owner and the current owner are not the same), storing the transaction owner as the current owner, and granting appropriate access to the current owner.

Referring to FIG. 4, with further reference to FIG. 1, the conceptual masters and domain table 68 is depicted as an access table 70. The access table 70 may be implemented via the hardware utilized by the access controllers 100*a*, 100*b*, 100*c*, 100*n*. In an embodiment, the access table 70 may be a data structure stored in a Read Only Memory (e.g., the internal memory 64). The access table 70 may be implemented in other programmable memory structures within the processing logic 62 (e.g., One Time Programmable (OTP) arrays). The access table 70 includes master interfaces 72 (including master ID values), and domain entries 74 (including domain ID values). Masters are entities configured to invoke commands (e.g., key owners for key commands and Data Owners for data commands). For example, the modem 14, Secure Processor EE 22, the Trust zone EE 24, and other EE(s) 28 may be masters. Masters may be membered by a master ID value. The master ID values may be rigid and fixed across a SoC. Values may be reserved for debug and boot operations, and for private key or public key buses. A range of master ID values may be assigned to a hypervisor interface and thus be managed by one or more hypervisor algorithms. Domains are address spaces with special access control settings that define areas for specific purposes with controlled access. In general, only a subset of the masters can access a domain. Domains may be numbered with a domain ID value. Some of the domain ID values may be rigid and set in hardware, and fixed across SoCs. Other domain ID values may be flexible, such as for use with a hypervisor, to create temporary domains for specific execution environments and/or applications. In an embodiment, a key owner may defer the selection of a domain by setting the domain ID value to zero, and the data owner may set the domain.

In general, behind each of the access controllers 100*a*, 100*b*, 100*c*, 100*n* there is a table of keys. Once a command passes an access controller, the key may be written in a table of keys in the crypto engine 12. A crypto engine 12 may use one of the keys in the table to decrypt data based on the received command. If a commend fails to pass an access controller, the keys that are stored with previous masters are invalidated.

The access table 70 indicates a domain vector 78 (i.e., domain mask) that is associated with a specific master ID value 76. The access table 70 maps master privileges to domains they can access. Each interface is tagged with its master and a mask of the domains it can access. The specific master ID value 76 may correspond to a calling entity's ID (e.g., designated bits, MID, VMID). A domain vector 78 may indicate that access to one or more domains may be managed by a hypervisor. Other domain vectors may expressly indicate which domains a master may access. For example, the TrustZone EE 24 may be a master with a master ID value of 1. The corresponding domain vector for the TrustZone master includes the defer domain (0), the TrustZone (1) domain, the hypervisor (HV)(4) domain, the video (5) domain, the audio (6) domain, the enterprise (7) domain, and the HLOS (8) domain. The domain mask for the TrustZone master excludes the modem (2) domain, the secure processor (3) domain, and the HV ad hoc (9-15) domains. In operation, the domain vector 78 may comprise a series of bits such that value of 1 indicates an allowable domain, and a value of zero indicates an excluded domain. The access table 70, and in particular the domain vectors, are means to associate various hardware blocks (i.e., memory locations, other execution environments) with a master. The access table 70 may be implemented in software and/or logic hardware such that one or more multiplexer modules may be used to associate a domain vector with the appropriate master ID value.

Figure 5:
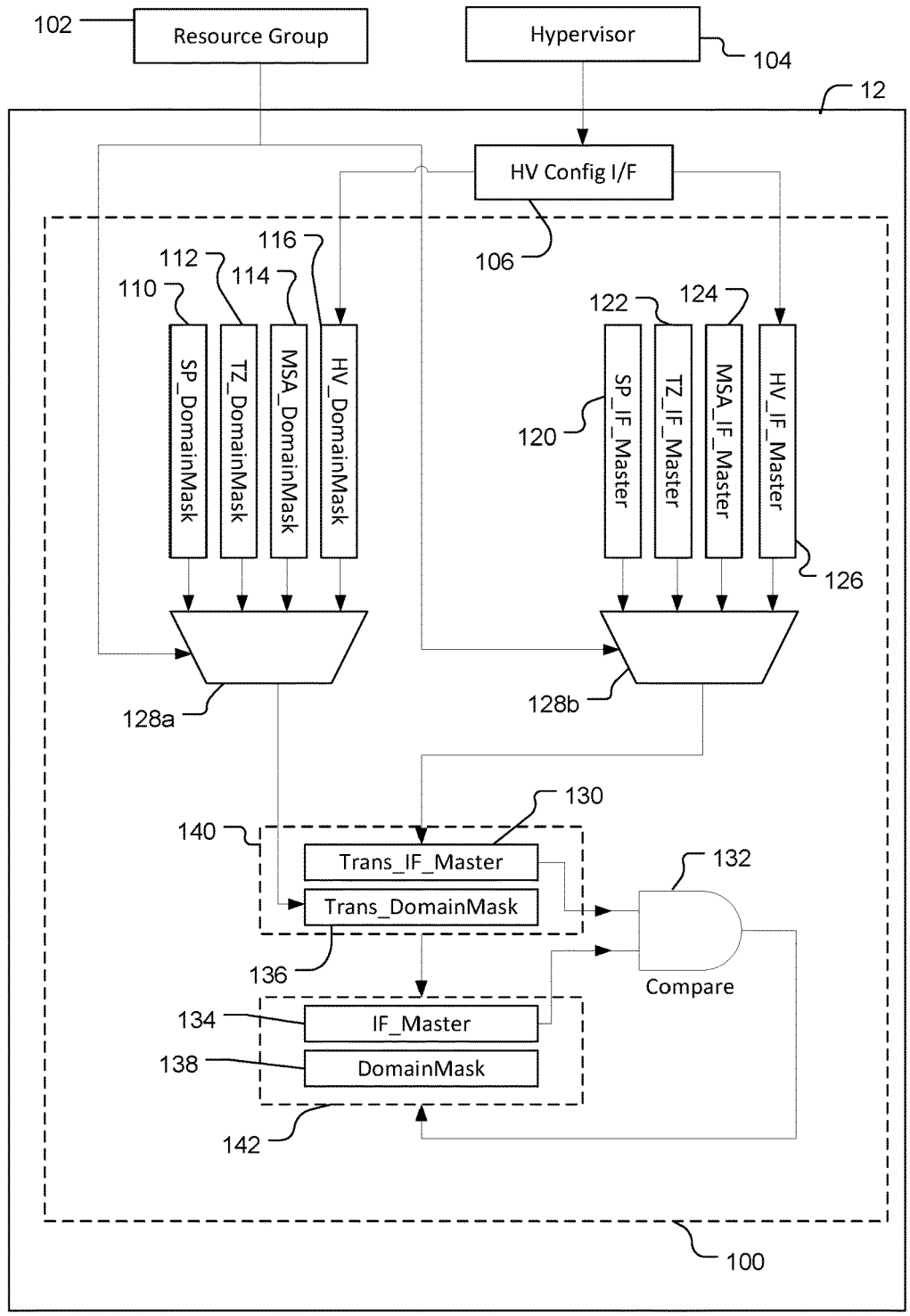
FIG. 5 is a block diagram of an access controller implemented on the system shown in FIG. 1.

Referring to FIG. 5, with further reference to FIGS. 1-4, a block diagram of an example access controller 100 is shown. The access controller 100 is one of the access controllers 100*a*, 100*b*, 100*c*, 100*n* depicted in FIG. 3. The access controller 100 is implemented within the crypto engine 12, and is configured to receive commands (e.g., memory access calls) from one or more EEs 28. In particular, the commands may be received via one or more resource groups 102 or one or more hypervisors 104. The resource group 102 may be included as part of a Memory Protection Unit (MPU), and the memory calls from the resource group 102 and hypervisor 104 may be received via private bus (not shown) that is operably connected to the crypto engine 12. A memory access request generated by a hypervisor 104 may be received by the hypervisor configuration interface (HV Config I/F) 106. The hypervisor configuration interface (HV Config I/F) 106 may be implemented within the crypto engine 12 (e.g., processor/hardware logic 62) and is configured to enable the privilege scheme depicted in FIG. 4 for HV controlled interfaces. The HV Config I/F 106 allows the hypervisor 104 to set the values of the HV_IF_Master 126 and the HV_DomainMask 116 per each interface (e.g., access controller 100). In an example, the access table 70 represents a collection of masters and corresponding domain vectors 78. The values illustrated on the access table 70 may be implemented as two 4×1 multiplexer modules in the access controller 100, shown as a first multiplexer module 128*a* and a second multiplexer module 128*b*, and bit maps corresponding to pairs of Interface Masters and Domain masks. The access controller 100 is not limited to four pairs of masters and domain masks (i.e., as shown in FIG. 5, as other multiplexers, data structures, and memory access techniques may also be used to implement multiple masters and domain masks (e.g., 4, 8, 11, 16, etc. . . . )). The multiplexer modules are configured to receive an input signal from the resource group 102 and determine a master interface and the corresponding domain mask. The four domain masks may include a special processor domain mask (SP_DomainMask) 110, a trust zone domain mask (TZ_DomainMask) 112, a modem domain mask (MSA_DomainMask) 114, and a hypervisor domain mask (HV_DomainMask) 116. The four master interfaces may include a secure processor master interface (SP_IF_Master) 120, a trust zone master interface (TZ_IF_Master) 122, a modem master interface (MSA_IF_Master) 124, and a hypervisor master interface (HV_IF_Master) 126. A HV Config I/F 106 configures the HV_IF_Master 126 and the HV_DomainMask 116 for every interface the hypervisor 104 owns. For example, in an SMMU based architecture, the SMMU may include a stream mapping table. The HV Config I/F is configured to align a SMMU stream mapping table with the corresponding domain mask (i.e., the privilege is managed by the hypervisor as depicted in FIG. 4).

In operation, the resource group 102 and/or hypervisor 104 may provide a command to the crypto engine 12. The command includes information regarding the identity of the caller (e.g., designated bits, MID, VMID). The command is provided to and processed with the multiplexer modules 128*a*, 128*b* to determine the transaction owner 140. The transaction owner 130 includes a transaction master interface (Trans_IF_Master) 130 as output by the second multiplexer module 128*b*, and a transaction domain mask (Trans_DomainMask) 136 as output by the first multiplexer module 128*a*. The transaction owner information may be stored in the internal memory 64. The crypto engine 12 is configured to detect a change in interface ownership in sequential commands. In an embodiment, the crypto engine 12 includes a comparator circuit 132 configured perform a comparison of the transaction owner 140 with a current owner 142. The current owner 142 includes an IF_Master field 134 and a DomainMask field 138. As will be described, the current owner 142 may be the transaction owner of the previous command and stored in the internal memory 64. The comparator circuit 132 compares the values of the Trans_IF_Master 130 with the IF_Master field 134. An interface ownership change event is detected if the values of the Trans_IF_Master 130 and the IF_Master field 134 are not equal. When an interface ownership change event occurs, the crypto engine 12 is configured to copy the transaction owner 140 to the current owner 142 (i.e., set IF_Master 134=Trans_IF_Master 130, and DomainMask 138=Trans_DomainMask 136). If the current owner 142 is a key group owner associated with a key group interface, the crypto engine 12 will invalidate or delete all keys in the key group. As a result of the invalidation, the keys can no longer be used by future commands, but any ongoing command can keep using the old key. If the current owner 142 is a data owner associated with a command channel interface, the crypto engine 12 is configured to lock the command channel while a command is running. New commands are approved only when a previous command is completed. The change in ownership event occurs when the access happens, and is not dependent on the time the MPU or HV are configured. Detecting the change of ownership events enables adaptive access control because it enables the crypto engine to adapt to a transaction without further configuration. In this adaptive control solution, rather than locking the interface to one owner (i.e., as in the SMMU or MPU solutions), the HW block is left open and will securely adapt to the master accessing it. This reduces the complexities associated with a locked interface in an MPU based solution (e.g., synchronization, potential security holes by leaving an interface open).

Figure 6:
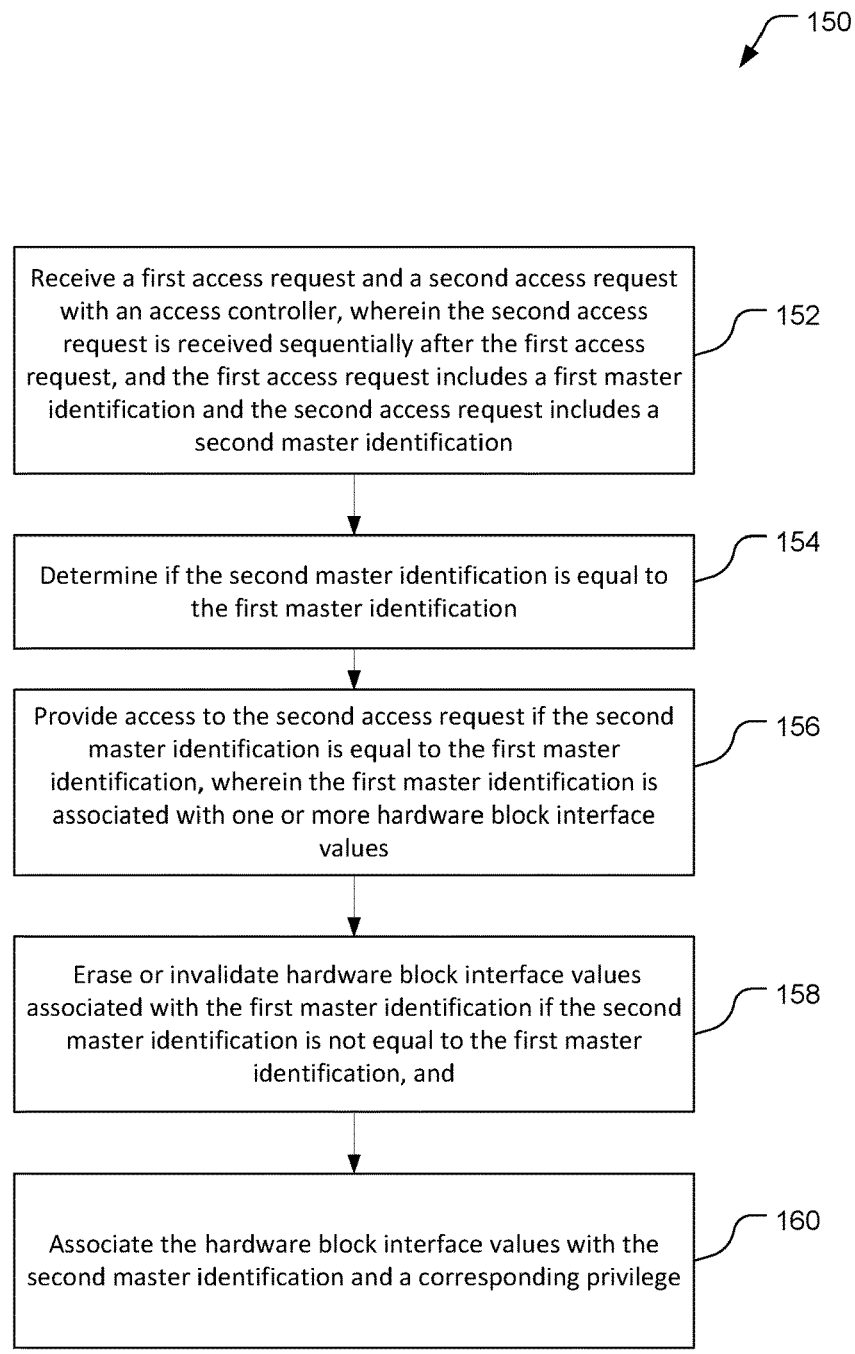
FIG. 6 is a block flow diagram of a process of adaptive access control of hardware blocks.

Referring to FIG. 6, with further reference to FIGS. 1-5, a process 150 of providing adaptive access control of hardware blocks includes the stages shown. The process 150 is, however, an example only and not limiting. The process 150 can be altered, e.g., by having stages added, removed, rearranged, combined, performed concurrently, and/or having single stages split into multiple stages. To help illustrate the process 150, a specific example of receiving a first memory access request from the trust zone execution environment 24 and a second memory request the secure processor execution environment 22 is described. This example includes operations not shown in FIG. 6, with such operations not being required as part of the process 150. In this example, the memory access request will originate from the resource group 102 included on a public bus (not shown). One or more of the EE(s) 30 may be operably connected to the public bus via a Memory Protection Unit (MPU). The initial values for the current owner 142 at the start of the process 150 are the trust zone interface master 122 and the trust zone domain mask 112 (i.e., IF_Master 134=TZ_IF_Master 122, and DomainMask 138=TZ_DomainMask 112). The access controller will evaluate the first and second memory access requests to determine whether a change in ownership event has occurred. On the detection of a change of ownership, the access controller 100 is configured to erase, permit and/or deny access as appropriate. The example discussed here is an example only, and not limiting of the system 10. Memory access commands may be sent by any of the execution environments 30 in any sequence.

At stage 152, the process 150 includes receiving, at a crypto engine, a first access request and a second access request with an access controller 100, such that the second access request is received sequentially after the first access request, and the first access request includes a first master identification and the second access request includes a second master identification. The first and second access requests may arrive at the crypto engine 12 via a private or public bus. In an example, the resource group 102 is on a public bus and the first and second access requests are from the trust zone execution environment 24 and the secure processor execution environment 22 respectively. The first and second access requests include entity ID information such as a series of designated bits to indicate a master ID. The master ID may be the same as a Machine ID (MID), or Virtual Machine ID (VMID) if the access request originated from a hypervisor based execution environment. The multiplexer modules 128*a*, 128*b* receive the first and second access requests and output the transaction domain mask 136 and the transaction interface master 130, respectively, based on the entity ID information included in the requests. Upon receiving the first access request (i.e., from the trust zone execution environment 24), the value of Trans_IF_Master 130 is set to the value corresponding to the TZ_IF_Master 122 (e.g., 1 as indicated on FIG. 4). The comparator circuit 132 compares the value of Trans_IF_Master 130 to the value of the current owner 142 (i.e., IF_Master 134). As described above, for this example, the initial value of IF_Master 134 is TZ_IF_Master 122. Thus, the transaction owner 140 of the first access request is equal to the current owner 142, and memory access is granted according to the DomainMask 138.

At stage 154, the access controller 100 is configured to determine if the second master is equal to the first master. Continuing the example, the crypto engine 12 receives the second access request from the resource group 102. The second request could have arrived via another resource group, or via the hypervisor 104. The second request is input to the multiplexer modules 128a, 128b in a manner that is identical the first access request. Since the second access request originated from the secure processor execution environment 22, the entity ID information is different from the first access request. In this case, the first multiplexer module 128a outputs the SP_DomainMask 110 values to the transaction owner 140 (i.e., Trans_DomainMask 136=SP_DomainMask 110), and the second multiplexer module 128b outputs the SP_IF_Master 120 value (e.g., 3 from FIG. 4) to the transaction owner (i.e., Trans_IF_Master 130=SP_IF_Master 120). The comparator circuit 132 compares the values of Trans_IF_Master 130 (e.g., 3) and IF_Master 134 (e.g., 1). In this case, a change of ownership is determined because the second master is not equal to the first master.

At stage 156, the crypto engine 12 is configured to provide access to the second access request if the second master identification is equal to the first master identification, wherein the first master identification is associated with one or more hardware block interface values. The comparator circuit 132 compares the value of Trans_IF_Master 130 to the value of the current owner 142 (i.e., IF_Master 134). If the values are equal (i.e., there has been no change in ownership), the crypto engine 12 provides access to the hardware block according to the DomainMask 138. For example, if the current owner 142 indicates that the current master (i.e., IF_Master) is the trust zone execution environment 24 (i.e., TZ_IF_Master), then the crypto engine 12 will allow access to hardware blocks based on the current domain mask (i.e., DomainMask 138). The access may be enabled through one or more hardware block interfaces. In this example, the following domains are indicated with "+" on FIG. 4 as being associated with the trust zone master: defer domain (0), TrustZone (1), HV (4), Video (5), Audio (6), Enterprise (7), and HLOS (8).

At stage 158, the crypto engine 12 is configured to erase or invalidate hardware block interface values associated with the first master identification if the second master identification is not equal to the first master identification. Continuing the example above, the second access request is received from the secure processor execution environment 22. The second multiplexer module 128b receives the second access request from the resource group 102 and outputs the SP_IF_Master 120 values based on the ID information included in the second access request. The SP_IF_Master 120 is stored as the transaction owner 140 (i.e., Trans_IF_Master 130) and is compared to the value of the current master (i.e., IF_Master 134). In this example, the value of the current owner 142 is based on the first access request (i.e., TZ_IF_Master 122), thus the comparator circuit 132 determines that the values are not equal. This change of ownership event is a trigger configured to cause the crypto engine 12 to erase/delete/invalidate everything the current interface owns (e.g., keys, storage, secrets, states, privileges). In this example, the hardware interface values associated with the TZ_IF_Master 122 are invalidated, and all access to the domains associated with the trust zone master (e.g., defer domain (0), TrustZone (1), HV (4), Video (5), Audio (6), Enterprise (7), and HLOS (8)) will not be accessible by the transaction owner (e.g., SP_IF_Master 120).

At stage 160, the crypto engine 12 is configured to associate the hardware block interface values with the second master identification and a corresponding privilege. The value of the current owner 142 (e.g., IF_Master 134 and DomainMask 138) are set to the values of the transaction owner 140 (e.g., Trans_IF_Master 130 and Trans_DomainMask 136). Continuing the example, the current owner 142 is set to the secure processor execution environment 22, and the crypto engine 12 is configured to provide privileges to the corresponding domains (e.g., as indicated in FIG. 4—defer domain (0), Sec-Proc (3), HV (4), Video (5), Audio (6), Enterprise (7), and HLOS (8)). The process 150 enables adaptive access control in that access to the domains may change based on the identity information contained in an access request. The access controller 100 evaluates each access request for a potential change in ownership. If the transaction owner and the current owner are not equal, the secured domains currently being accessed will become inaccessible to the transaction owner. This adaptive approach may reduce the complexities associated with a locked interface in an MPU solution.

Figure 7:
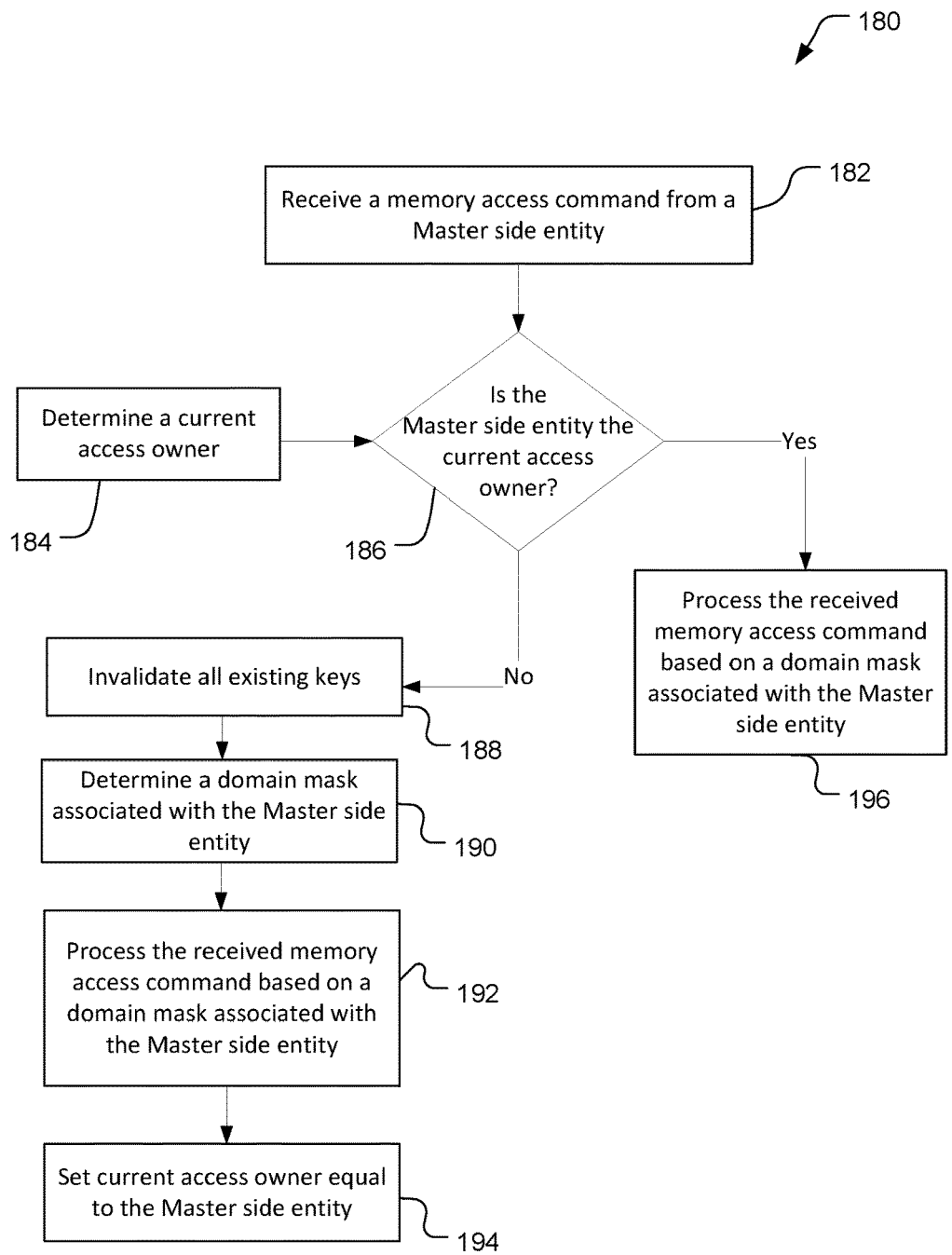
FIG. 7 is a block flow diagram of a process of providing access to slave side memory resources based on the identification of the transaction owner.

Referring to FIG. 7, with further reference to FIGS. 1-6, a process 180 of providing access to slave side memory resources based on the identity of the transaction owner includes the stages shown. The process 180 is, however, an example only and not limiting. The process 180 can be altered, e.g., by having stages added, removed, rearranged, combined, performed concurrently, and/or having single stages split into multiple stages.

At stage 182, the access controller 100 is configured to receive a memory access command from a Master side entity. The access controller 100 may reside within the crypto engine 12, and may utilize the processor/hardware logic 62 and internal memory 64 as a means to receive an access command. The access command may arrive via a private or public bus associated with, for example, a resource group 102 or a hypervisor 104, and will include information to identity the master side entity (e.g., designated bits, MID, VMID).

At stage 184, the access controller 100 is configured to determine a current access owner. The internal memory 64 may include one or more registers configured to store current access owner information (e.g., a current owner variable). The current access owner information is associated with master entity that is currently accessing slave side memory resources. For example, the current access owner information may be based on a MID or VMID for an execution environment 30, and the ID information may be stored in the internal memory 64. The processor/hardware logic 62 may be a means to read the internal memory and determine the current owner.

At stage 186, the access controller 100 is configured to determine if the master side entity is the current access owner. In an example, the current access owner is based on and ID values stored in the internal memory 64 and the memory access command includes ID information corresponding to the Master side entity. The access controller 100 may utilize the comparator circuit 132 as a means for determining if the master side entity is the current owner. That is, the comparator circuit 132 may compare the ID information associated with Master side entity in the memory access command received at stage 182, with the current access owner information stored at stage 184. If the Master side entity is the current access owner, then the process 180 continues to stage 196. Else, the process proceeds to stage 188.

At stage 196, the crypto engine 12 is configured to process the received memory access command based on a domain mask associated with the Master side entity. The processor/hardware logic 62 and the corresponding access table 70 values (e.g., RTL, as stored in ROM, or hard coded in a memory unit) within the crypto engine 12 may be configured as a means to process the memory access command based on a domain mask associated with the Master side entity. For example, referring to FIG. 4, the conceptual MDT 68 may include at least a portion of the access table 70. The domain entries 74 are associated with their corresponding master interfaces 72. The crypto engine 12 is configured to grant or deny access based on the access table 70. In the case when the master side entity is associated with a hypervisor 104, the HV Config I/F 106 is a means for managing the privileges indicated in the access table 70. The HV Config I/F 106 may provide the HV_DomainMask 116 as an input to the first multiplexer module 128a, and the HV_IF_Master 126 as an input the second multiplexer module 128b. Thus, these values may be used as the transaction owner 140 (e.g., Trans_IF_Master 130, Trans_DomainMask 136), and the current owner 142 (e.g., IF_Master 134, DomainMask 138), and available to the comparator circuit 132 as previously described. In an example, hypervisor control can be implemented through a set of registers or memory space that is accessible by hypervisor 104. Domain vectors (e.g., domain masks) are included as part of that space. The hypervisor 104 may manage privileges for masters it oversees by configuring the domain masks for masters ahead of time such that the hardware can act on that configuration when subsequently accessed by those masters.

At stage 188, if the Master side entity is not the current owner (i.e., there is a change in ownership event), the crypto engine 12 is configured to invalidate all existing keys. The crypto engine 12 may invalidate keys in a key group such that keys will not be valid for future commands. The processor/hardware logic 62 and the internal memory 64 may be a means to invalidate the existing keys.

At stage 190, the access controller 100 is configured to determine a domain mask associated with the Master side entity. The memory access command includes information to identify the Master side entity (i.e., designated bits, MID, VMID), and the multiplexer modules 128a, 128b may be a means to determine a domain mask based on the identity information. For example, the multiplexer modules 128a, 128b may receive a memory access command from the resource group 102, and output a domain mask ID, or other information the crypto engine 12 may use to assign a domain vector. In an example, a domain vector may include values of 1 and 0 corresponding to the domain values in the access table 70. The domain mask information output from the first multiplexer module 128a may be stored in the internal memory 64, as a transaction domain mask variable (e.g., Trans_DomainMask 136).

At stage 192, the crypto engine 12 is configured to process the received memory access command. The access controller 100 determines a domain mask that is associated with the Master side entity and may approve new commands based on the domain mask. This allows the crypto engine 12 to be a means for processing the received memory access command in an adaptive manner. That is, the crypto engine 12 may adapt to a transaction without additional configuration to an MPU (i.e., in prior slave side solutions), or an SMMU (i.e., in prior master side solutions). At stage 194, the access controller 100 may set the current owner variable to the value of the identification information associated with the Master side entity. The processor/hardware logic 62 and the internal memory 64 may be a means to set the value of the current owner 142 to be equal to the value of the transaction owner 140 (i.e., the Master side entity).

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A alone, or B alone, or C alone, or AB, or AC, or BC, or ABC (i.e., A and B and C), or combinations with more than one of the same feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include that the information is conveyed from a sending entity but does not reach an intended recipient of the information. The intended recipient, even though not actually receiving the information, may still be referred to as a receiving entity, e.g., a receiving execution environment.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A method of providing access to slave side memory resources based on an identity of a master side entity, comprising:
   determining a current access owner;
   receiving a memory access command from the master side entity;
   processing the memory access command based on a domain mask associated with the master side entity if the master side entity is the current access owner;
   if the master side entity is not the current access owner, then
      invalidating all existing keys;
      determining the domain mask associated with the master side entity;
      processing the memory access command based on the domain mask associated with the master side entity; and
      setting the current access owner equal to the master side entity.

2. The method of claim 1 wherein the master side entity is a hypervisor.

3. The method of claim 2 wherein the memory access command includes a hypervisor machine identity (HVID) value.

4. The method of claim 1 wherein the memory access command is received from a resource group of a Memory Protection Unit (MPU).

5. The method of claim 1 wherein the memory access command includes a machine identity (MID) value.

6. The method of claim 5 wherein determining the domain mask associated with the master side entity includes providing the MID value to one or more multiplexer modules and receiving a domain identification from the one or more multiplexer modules.

7. A system for providing access to slave side memory resources based on an identity of a master side entity, comprising:
   a memory unit for storing instructions; and
   a processor unit coupled to the memory unit and configured to:
      determine a current access owner;
      receive a memory access command from the master side entity;
      process the memory access command based on a domain mask associated with the master side entity if the master side entity is the current access owner;
      if the master side entity is not the current access owner, then
         invalidate all existing keys;
         determine the domain mask associated with the master side entity;
         process the memory access command based on the domain mask associated with the master side entity; and
         set the current access owner equal to the master side entity.

8. The system of claim 7 wherein the master side entity is a hypervisor.

9. The system of claim 8 wherein the memory access command includes a hypervisor machine identity (HVID) value.

10. The system of claim 7 wherein the memory access command is received from a resource group of a Memory Protection Unit (MPU).

11. The system of claim 7 wherein the memory access command includes a machine identity (MID) value.

12. The system of claim 11 wherein the processor unit is configure to provide the MID value to one or more multiplexer modules and receive a domain identification from the one or more multiplexer modules.

13. An apparatus for providing access to slave side memory resources based on an identity of a master side entity, comprising:
    means for determining a current access owner;
    means for receiving a memory access command from the master side entity;
    means for processing the memory access command based on a domain mask associated with the master side entity if the master side entity is the current access owner;
    if the master side entity is not the current access owner, then
        means for invalidating all existing keys;
        means for determining the domain mask associated with the master side entity;
        means for processing the memory access command based on the domain mask associated with the master side entity; and
        means for setting the current access owner equal to the master side entity.

14. The apparatus of claim 13 wherein the master side entity is a hypervisor.

15. The apparatus of claim 14 wherein the memory access command includes a hypervisor machine identity (HVID) value.

16. The apparatus of claim 13 wherein the memory access command is received from a resource group of a Memory Protection Unit (MPU).

17. The apparatus of claim 13 wherein the memory access command includes a machine identity (MID) value.

18. The apparatus of claim 17 wherein determining the domain mask associated with the master side entity includes means for providing the MID value to one or more multiplexer modules and means for receiving a domain identification from the one or more multiplexer modules.

19. A non-transitory processor-readable storage medium comprising instructions for providing access to slave side memory resources based on an identity of a master side entity, comprising:
    code for determining a current access owner;
    code for receiving a memory access command from the master side entity;
    code for processing the memory access command based on a domain mask associated with the master side entity if the master side entity is the current access owner;
    if the master side entity is not the current access owner, then
        code for invalidating all existing keys;
        code for determining the domain mask associated with the master side entity;
        code for processing the memory access command based on the domain mask associated with the master side entity; and
        code for setting the current access owner equal to the master side entity.

20. The non-transitory processor-readable storage medium of claim 19 wherein the master side entity is a hypervisor.

21. The non-transitory processor-readable storage medium of claim 20 wherein the memory access command includes a hypervisor machine identity (HVID) value.

22. The non-transitory processor-readable storage medium of claim 19 wherein the memory access command is received from a resource group of a Memory Protection Unit (MPU).

23. The non-transitory processor-readable storage medium of claim 19 wherein the memory access command includes a machine identity (MID) value.

24. The non-transitory processor-readable storage medium of claim 23 wherein the code for determining the domain mask associated with the master side entity includes code for providing the MID value to one or more multiplexer modules and code for receiving a domain identification from the one or more multiplexer modules.

* * * * *